United States Patent
Tomberg et al.

(10) Patent No.: US 6,857,853 B1
(45) Date of Patent: Feb. 22, 2005

(54) CONICAL TIP SHROUD FILLET FOR A TURBINE BUCKET

(75) Inventors: Steven Eric Tomberg, Simpsonville, SC (US); Marvin Luther Neeley, Mauldin, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/639,473

(22) Filed: Aug. 13, 2003

(51) Int. Cl.$^7$ ............................................. F01D 5/22
(52) U.S. Cl. .................. 416/192; 416/223 A; 416/248; 415/914
(58) Field of Search ............................ 416/192–193 A, 416/248, 219 R, 223 A; 415/914, 181, 191–195

(56) References Cited

U.S. PATENT DOCUMENTS

| | | | | |
|---|---|---|---|---|
| 4,259,037 A | * | 3/1981 | Anderson | 416/96 R |
| 5,244,345 A | * | 9/1993 | Curtis | 416/95 |
| 5,397,215 A | * | 3/1995 | Spear et al. | 415/191 |
| 6,017,186 A | * | 1/2000 | Hoeger et al. | 415/181 |
| 6,283,713 B1 | * | 9/2001 | Harvey et al. | 416/193 A |
| 6,524,070 B1 | * | 2/2003 | Carter | 416/193 A |

* cited by examiner

Primary Examiner—Edward K. Look
Assistant Examiner—James M. McAleenan
(74) Attorney, Agent, or Firm—Nixon & Vanderhye

(57) ABSTRACT

A turbine bucket airfoil has a conical fillet about the intersection of the airfoil tip and tip shroud having a nominal profile in accordance with coordinate values of X and Y, offset 1, offset 2 and Rho set forth in Table I. The shape parameters of offset 1, offset 2 and Rho define the configuration of the fillet at the specified X and Y locations about the fillet to provide a fillet configuration accommodating high localized stresses. The fillet shape may be parabolic, elliptical or hyperbolic as a function of the value of the shape parameter ratio of $$\frac{D1}{D1+D2}$$

at each X, Y location where D1 is a distance between an intermediate point along a chord between edge points determined by offsets O2 and O2 and a shoulder point on the fillet surface and D2 is a distance between the shoulder point and an apex location at the intersection of the airfoil tip and tip shroud.

12 Claims, 7 Drawing Sheets

CONICAL TIP SHROUD FILLET FOR A TURBINE BUCKET

BACKGROUND OF THE INVENTION

The present invention relates to a variable conical fillet between an airfoil tip of a turbine bucket and a bucket tip shroud and particularly relates to a conical fillet shaped and sized to improve part life, performance and manufacturing of the turbine bucket.

Turbine buckets generally comprise an airfoil, a platform, shank and dovetail along a radial inner end portion of the bucket and often a tip shroud at the tip of the airfoil in mechanical engagement with tip shrouds of adjacent buckets. The tip shroud and airfoil of a conventional turbine bucket are typically provided with a simple fillet shape of a predetermined size and generally of a constant radius about the intersection of the tip shroud and the airfoil tip. That is, a generally uniform radius was applied to the shroud fillet as the fillet was applied about the intersection of the airfoil tip and tip shroud. The fillet lowered the stress concentration between the airfoil and tip shroud.

While the stresses were reduced by use of constant radius fillets, it was discovered that high stresses in the fillet region were localized at various locations or points in and about the fillet between the airfoil and tip shroud and that such localized stresses lead to significant decreases in bucket life. Thus, while stresses were reduced by the application of fillets of constant radius, the localized high stresses in critical areas were still present. These stresses reduced the creep life of the tip shroud which can lead to premature failure of the bucket. It will also be appreciated that the failure of a single bucket causes the turbine to be taken offline for repair. This is a time-consuming and costly outage, causing the customer as well as the turbine producer to incur higher costs due to unproductivity, labor, part repair, outage time and replacement. Consequently, there has developed a need for a customization of the fillet between the tip of the airfoil and the tip shroud of a bucket to provide a more uniform distribution of stress taking into account the high localized stresses about the fillet as well as reducing the mass of the fillet thereby to extend the creep life of the tip shroud.

BRIEF DESCRIPTION OF THE INVENTION

In accordance with the preferred embodiment of the present invention, there is provided a variable conical fillet between the airfoil tip and the tip shroud which minimizes creep as well as the mass of the fillet by varying the fillet size and configuration as a function of the high localized stresses about the intersection of the airfoil tip and tip shroud. The variable conical fillet profile is a function of an offset 1, an offset 2, Rho and discrete X, Y apex locations about the intersection of the airfoil and tip shroud. Offset 1 is a distance normal to the airfoil surface at each apex location projected along the airfoil surface and offset 2 is a distance extending normal to the tip shroud undersurface at each apex location projected along the tip shroud undersurface. Normals projected onto the airfoil surface and tip shroud undersurface from the intersection of offsets 1 and 2 define edge points which, upon connection about the respective tip shroud and airfoil, form the edges of the fillet. The offsets are determined by finite element stress analysis to minimize stress. Rho is a shape parameter defining the shape of the fillet at each apex location. These factors are utilized at various X and Y locations about the intersection of the airfoil tip and tip shroud, enabling the fillet to take on a variably configured profile at each location to evenly distribute the stress about the fillet while simultaneously minimizing the mass added to the bucket fillet. The shape of the fillet is thus biased toward the tip shroud or to the airfoil as determined by the stress analysis at the particular location under consideration whereby the high local stresses are accommodated and the mass of the fillet is minimized.

Particularly, the optimized conical tip shroud fillet hereof is defined, in a preferred embodiment, by 15 locations or points about the intersection of the tip shroud and airfoil tip with each location having three parameters, i.e., offset 1, offset 2 and Rho, which define the extent and shape of the fillet at that location. By varying the fillet in accordance with these parameters about the intersection, tip shroud creep life can be maximized while minimizing the mass of the bucket at the fillet. Particular locations and parameters are set forth in Table I below for the tip shroud/airfoil fillet of a second stage of a three stage turbine having 92 buckets. It will be appreciated that the number of locations at which these parameters are applied may vary while maintaining the shape of the fillet within a robust envelope sufficient to achieve the objectives of maximizing creep life and reducing bucket mass.

In a preferred embodiment according to the present invention, there is provided a turbine bucket having an airfoil, an airfoil tip, a tip shroud, and a fillet about an intersection of said airfoil tip and the tip shroud, the fillet having a fillet profile variable about the intersection as a function of localized stresses about the intersection.

In a further preferred embodiment according to the present invention, there is provided a turbine bucket having an airfoil, an airfoil tip, a tip shroud and a fillet about an intersection of the airfoil tip and the tip shroud, the fillet having a nominal profile substantially in accordance with coordinate values of X and Y, offset 1, offset 2 and Rho set forth in Table 1 wherein X and Y define in inches discrete apex locations about the intersection of the airfoil tip and tip shroud, offset 1 and offset 2 are distances in inches perpendicular to the airfoil surface and tip shroud undersurface, respectively, at each respective X, Y location projected along the airfoil surface and tip shroud undersurface and which offsets intersect with one another such that normal projections from the intersection of the offsets onto the tip shroud undersurface and airfoil surface, respectively, define edge points which, upon connection about the respective tip shroud and airfoil, define edges of the fillet, and Rho is a non-dimensional shape parameter ratio of $$\frac{D1}{D1+D2}$$

at each apex location, wherein D1 is a distance between a midpoint along a chord between the fillet edge points and a shoulder point on a surface of the fillet and D2 is a distance between the shoulder point and the apex location, the fillet edge points on the tip shroud and the airfoil at each X, Y location being connected by a smooth continuing arc passing through the shoulder point in accordance with the shape parameter Rho to define a profile section at each apex location, the profile sections at each apex location being joined smoothly with one another to form the nominal fillet profile.

DETAILED DESCRIPTION OF THE INVENTION

Figure 1:
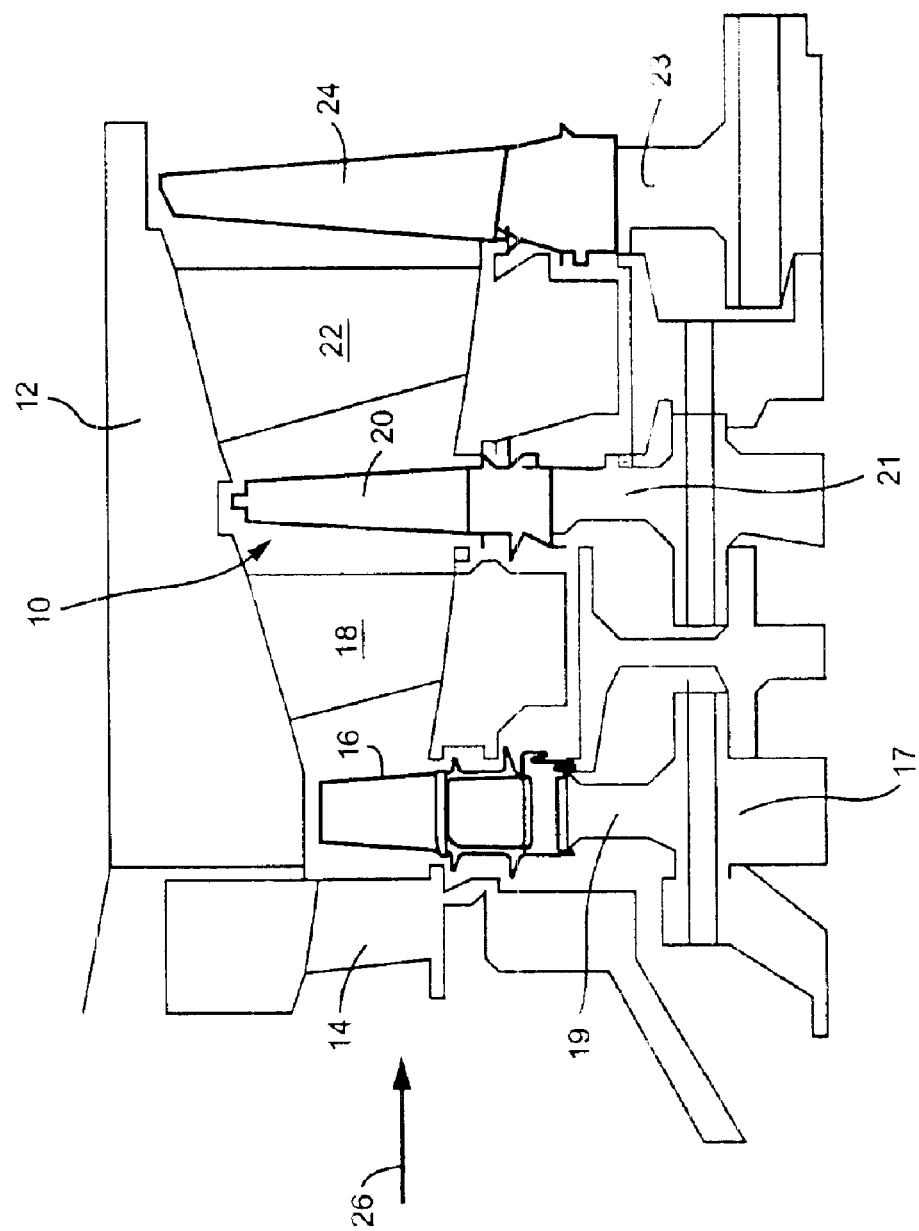
FIG. 1 is a schematic representation of a hot gas path through multiple stages of a gas turbine and illustrates a second stage bucket airfoil having a conical tip shroud fillet according to a preferred embodiment of the present invention.

Referring now to the drawings, particularly to FIG. 1, there is illustrated a hot gas path, generally designated 10, of a gas turbine 12 including a plurality of turbine stages. Three stages are illustrated. For example, the first stage comprises a plurality of circumferentially spaced nozzles 14 and buckets 16. The nozzles are circumferentially spaced one from the other and fixed about the axis of the rotor. The first stage buckets 16, of course, are mounted on the turbine rotor 17 via a rotor wheel 19. A second stage of the turbine 12 is also illustrated, including a plurality of circumferentially spaced nozzles 18 and a plurality of circumferentially spaced buckets 20 mounted on the rotor 17 via a rotor wheel 21. The third stage is also illustrated including a plurality of circumferentially spaced nozzles 22 and buckets 24 mounted on rotor 17 via a rotor wheel 23. It will be appreciated that the nozzles and buckets lie in the hot gas path 10 of the turbine, the direction of flow of the hot gas through the hot gas path 10 being indicated by the arrow 26.

Figure 2:
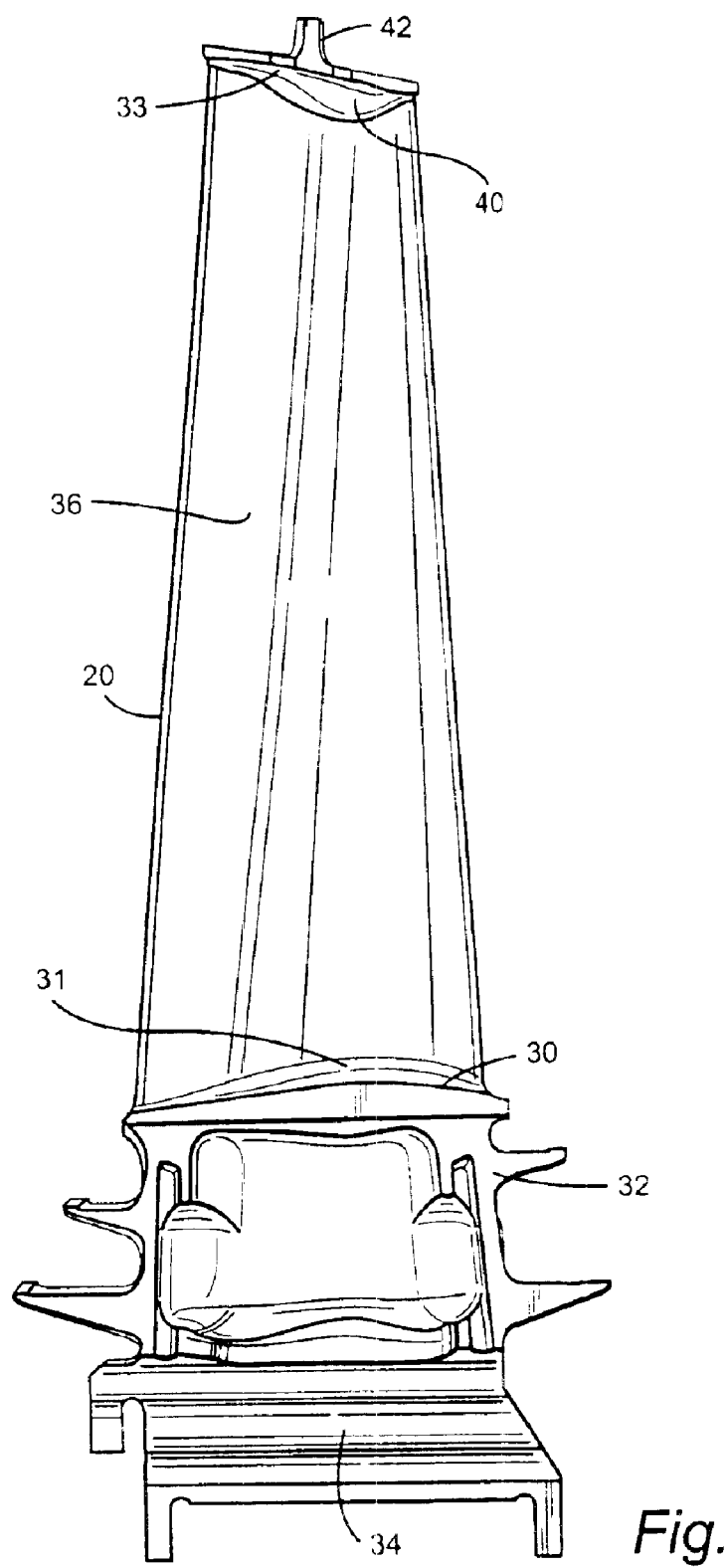
FIGS. 2 and 3 are opposite side elevational views of the second stage bucket of FIG. 1 as viewed in a generally circumferential direction.

Each bucket 20 of the second stage is provided with a platform 30, a shank 32 and a substantially or near axial entry dovetail 34 for connection with a complementary-shaped mating dovetail, not shown, on the rotor wheel 21. It will also be appreciated that each bucket 20 has a bucket airfoil 36, for example, as illustrated in FIG. 2. Thus, each of the buckets 20 has a bucket airfoil profile at any cross-section from the airfoil root 31 to the bucket tip 33 in the shape of an airfoil.

Figure 3:
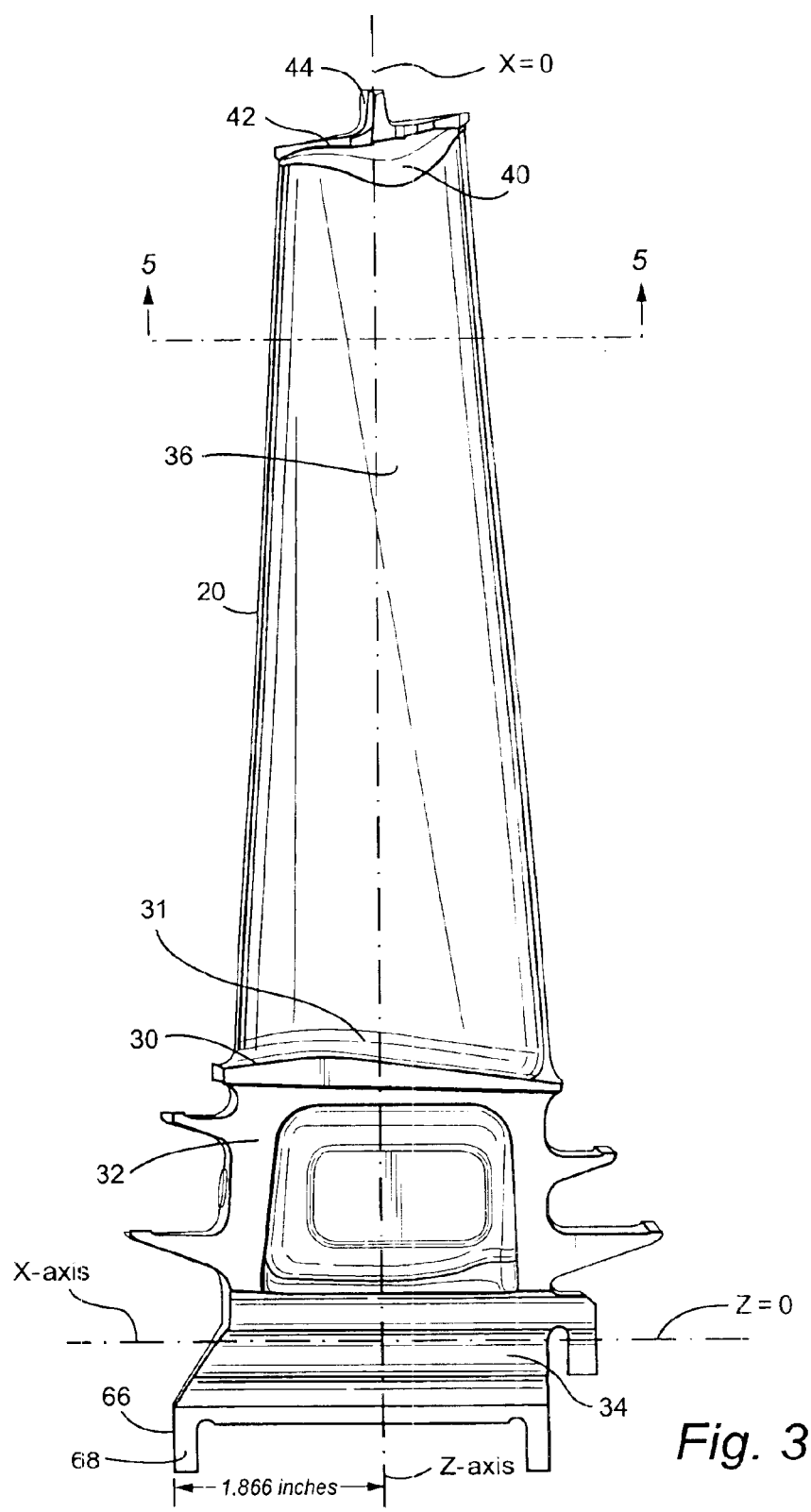
Figure 8:
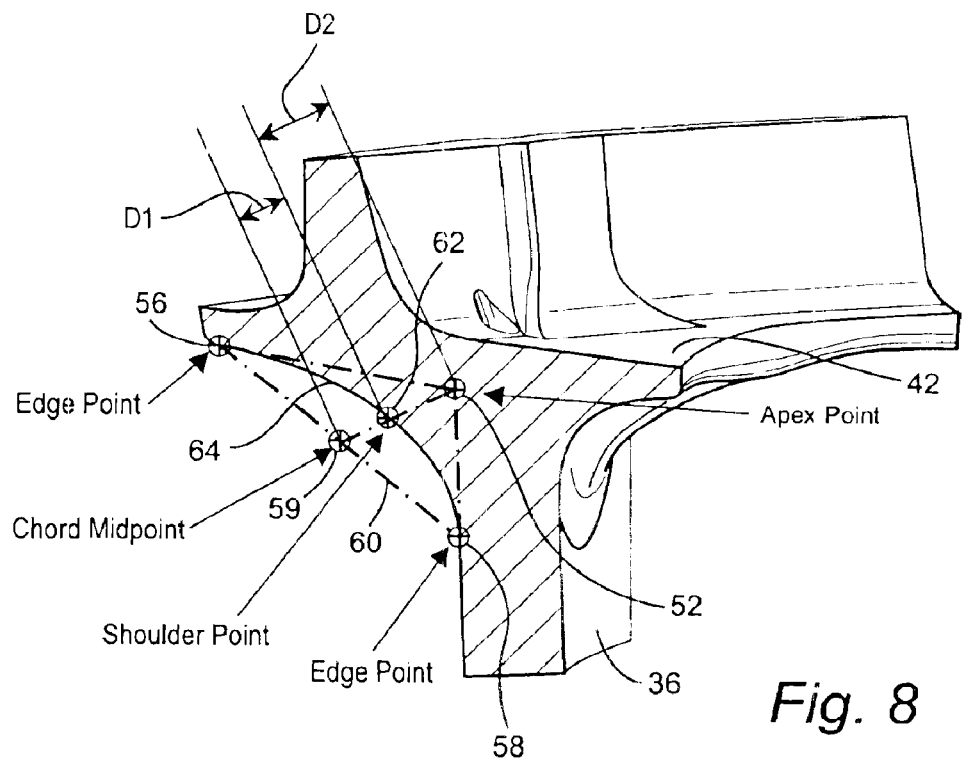

Referring now to FIGS. 2–6, the bucket 20 includes a fillet 40 between the tip of the airfoil 36 and a tip shroud 42. As illustrated in FIGS. 2, 3 and 8, the tip shroud 42 includes a seal 44 extending in a circumferential direction and having a cutter tooth 44 for sealing with a fixed shroud. The fillet 40 extends about the intersection between the tip of the airfoil and the tip shroud 42. In accordance with the present invention, the fillet 40 is sized and configured about the intersection of the tip shroud and airfoil tip to minimize creep, as well as the mass of the fillet, as a function of the location of the localized stresses about the intersection. That is, the shape of the fillet is biased toward the tip shroud or the airfoil in accordance with a stress analysis at each location about the intersection such that the high local stresses are accommodated and the mass of the fillet at each such location is minimized.

In a preferred embodiment of the present invention, the tip shroud fillet 40 is defined by fifteen points P1–P15 (FIG. 9) in an X, Y coordinate system about the intersection of the tip shroud and airfoil tip. At each X, Y location, the configuration of the fillet is determined by three parameters, offset 1 (O1), offset 2 (O2) and Rho. By defining the variable conical fillet 40 using these parameters, tip shroud creep life is optimized, while maintaining the mass of the bucket to a minimum.

Figure 9:
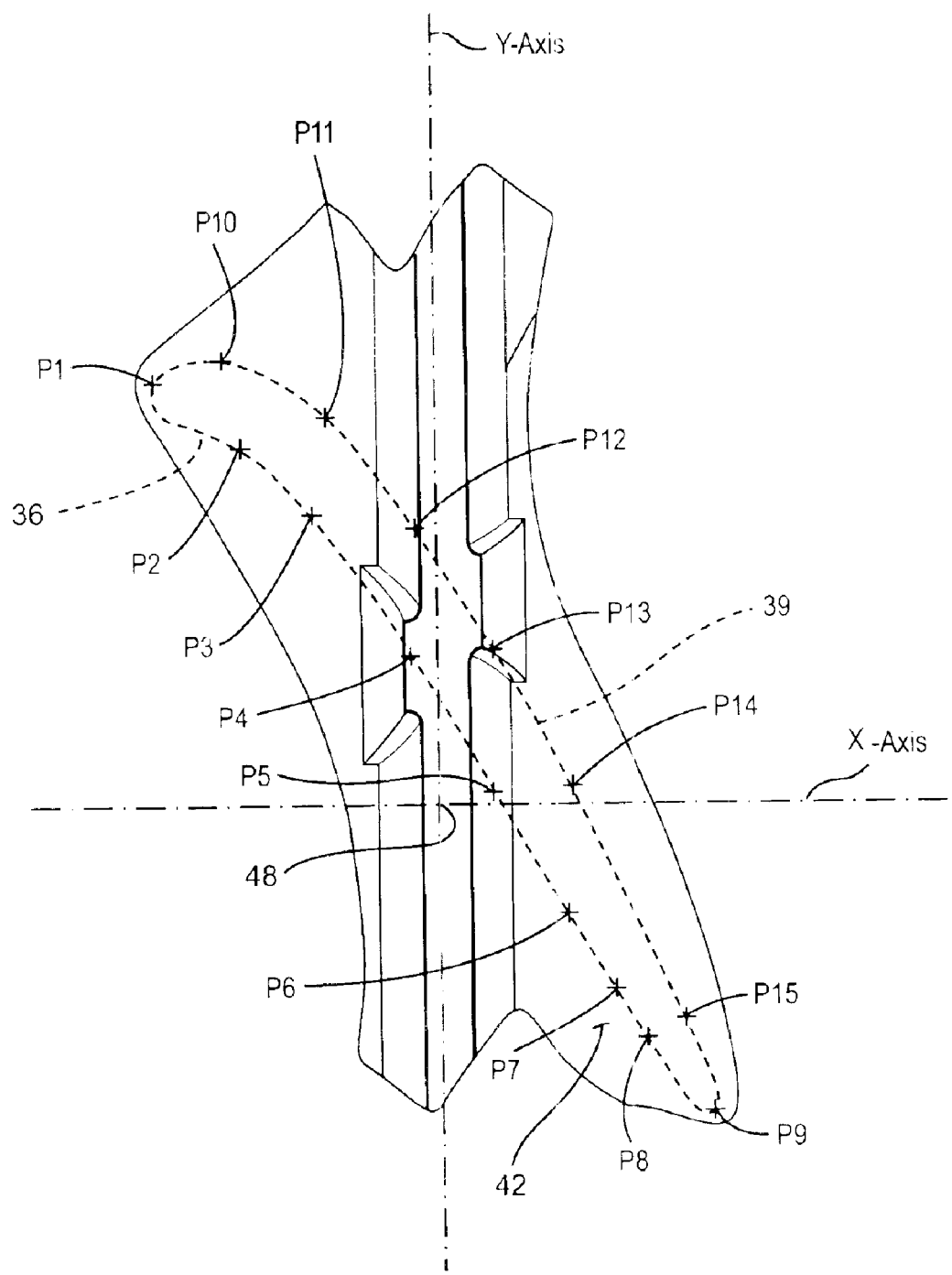
FIG. 9 is an end view of the tip shroud looking radially inwardly illustrating the locations of the X, Y and Z coordinates set forth in Table 1 below.

Particularly, and referring to FIG. 9, there is illustrated an X, Y coordinate system with the X axis in FIG. 9 extending horizontally at Y=0 and the Y axis extending vertically at X=0, the axes intersecting at an origin 48. The origin 48 extends along the stacking axis of the airfoil in a radial direction. The X, Y coordinates and the origin use the same X, Y coordinates as set forth in co-pending application Ser. No. 10/460,205, filled Jun. 13, 2003, the contents of which are incorporated herein by reference. Also illustrated in FIG. 9 are a plurality of locations about the intersection of the airfoil 36 and the undersurface of the tip shroud 42 and designated by the letter P, followed by a number defining the location, the intersection being designated an apex location in FIG. 7 at 52. In Table I below, the locations P1–P15 are defined by the X, Y coordinates set forth in the table.

Figure 7:
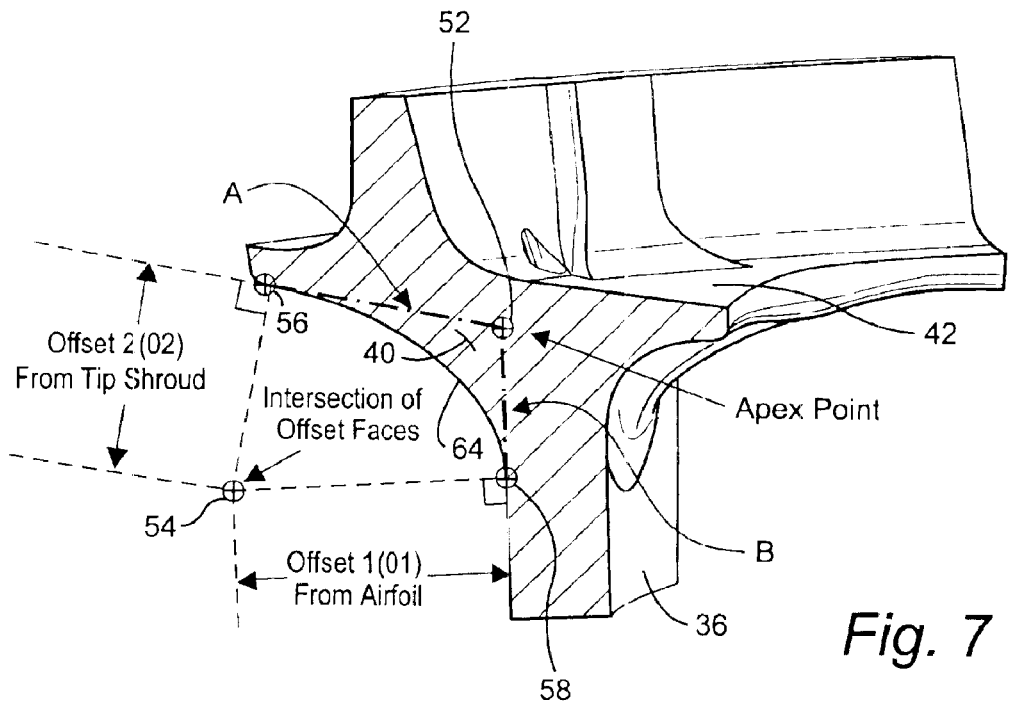
FIGS. 7 and 8 are cross-sectional views thereof taken through the airfoil and tip shroud generally about on line 7—7 in FIG. 5.

The configuration of the conical fillet 40 is dependent at each X, Y location upon three parameters: offset 1, offset 2 and Rho. Offset 1 as illustrated in FIG. 7 and designated O1 is a distance in inches along a normal from the airfoil 36 at each X, Y location designated P and projected along the airfoil surface. Offset O2 defines in inches a distance along a normal from the tip shroud 42 at each X, Y location P and projected along the undersurface of the tip shroud. The offsets O1 and O2 are determined by finite stress analysis in an iterative process at each location about the tip shroud and airfoil tip intersection, resulting in a more even distribution of stresses about the fillet as well as minimization of the bucket mass at the fillet region. The offsets O1 and O2 intersect at 54 in FIG. 7. Normal projections from the intersection 54 onto the tip shroud and airfoil define edge points 56 and 58, respectively, which, upon connection about the respective tip shroud and airfoil, define edges of the fillet.

Rho is a non-dimensional shape parameter ratio at each location P. Rho is the ratio of $$\frac{D1}{D1+D2}$$

wherein, as illustrated in FIG. 8, D1 is a distance between a midpoint 59 of a chord 60 extending between edge points 56 and 58 and a shoulder point 62 on the surface of fillet 40 and D2 is a distance between the shoulder point 62 and the apex location 52. Thus, by connecting the edge points 56 and 58 determined by offsets 1 and 2 with smooth continuing arcs passing through the shoulder point 62 in accordance with the shape parameter Rho, there is defined a fillet profile section at each apex location P which minimizes the stress. It will be appreciated that the surface shapes of the fillets, i.e., the fillet profile section 64 at each location P, are joined smoothly to one another to form the nominal fillet profile about the intersection of the airfoil tip and the tip shroud. It will be appreciated from a review of FIG. 8 that the shape of the fillet surface 64 may vary dependent on the value of Rho. For example, a small value of Rho produces a very flat conic surface, while a large Rho value produces a very pointed conic. The Rho value thus determines the shape of the conic having a parabolic shape at Rho equals 0.5, an elliptical shape where Rho is greater than 0.0 and less than 0.5 and a hyperbolic shape where Rho is greater than 0.5 and less than 1.0.

The X, Y coordinate values, as well as the parameters offset 1 (01), offset 2 (02), D1, D2 and Rho are given in Table I as follows:

TABLE I

| Point | X | Y | Z | Z' Centerline | Offset 1 From the Airfloil | Offset 2 from the tip Shroud | A | B | D1 | D2 | Rho |
|---|---|---|---|---|---|---|---|---|---|---|---|
| P1 | −0.793 | 1.272 | 10.669 | 34.789 | 0.070 | 0.070 | 0.085 | 0.083 | 0.031 | 0.031 | 0.50 |
| P2 | −0.548 | 1.101 | 10.725 | 34.825 | 0.150 | 0.100 | 0.191 | 0.133 | 0.063 | 0.063 | 0.50 |
| P3 | −0.349 | 0.907 | 10.769 | 34.869 | 0.200 | 0.175 | 0.238 | 0.220 | 0.088 | 0.088 | 0.50 |
| P4 | −0.089 | 0.527 | 10.831 | 34.931 | 0.310 | 0.325 | 0.368 | 0.371 | 0.113 | 0.169 | 0.40 |
| P5 | 0.135 | 0.157 | 10.882 | 34.982 | 0.575 | 0.375 | 0.640 | 0.465 | 0.170 | 0.255 | 0.40 |
| P6 | 0.334 | −0.178 | 10.924 | 35.024 | 0.475 | 0.340 | 0.522 | 0.411 | 0.160 | 0.195 | 0.45 |
| P7 | 0.459 | −0.387 | 10.949 | 35.049 | 0.325 | 0.285 | 0.357 | 0.331 | 0.130 | 0.130 | 0.50 |
| P8 | 0.546 | −0.522 | 10.965 | 35.065 | 0.225 | 0.230 | 0.243 | 0.250 | 0.095 | 0.095 | 0.50 |
| P9 | 0.717 | −0.721 | 10.998 | 35.098 | 0.070 | 0.070 | 0.068 | 0.066 | 0.025 | 0.025 | 0.50 |
| P10 | −0.595 | 1.346 | 10.705 | 34.805 | 0.400 | 0.275 | 0.370 | 0.225 | 0.090 | 0.110 | 0.45 |
| P11 | −0.312 | 1.179 | 10.769 | 34.869 | 0.600 | 0.450 | 0.527 | 0.349 | 0.115 | 0.170 | 0.40 |
| P12 | −0.074 | 0.875 | 10.828 | 34.928 | 0.500 | 0.400 | 0.448 | 0.330 | 0.103 | 0.155 | 0.40 |
| P13 | 0.140 | 0.541 | 10.880 | 34.980 | 0.250 | 0.300 | 0.213 | 0.267 | 0.070 | 0.085 | 0.45 |
| P14 | 0.345 | 0.164 | 10.927 | 35.027 | 0.150 | 0.175 | 0.122 | 0.157 | 0.045 | 0.045 | 0.50 |
| P15 | 0.646 | −0.466 | 10.990 | 35.090 | 0.100 | 0.100 | 0.085 | 0.091 | 0.028 | 0.028 | 0.50 |

Figure 4:
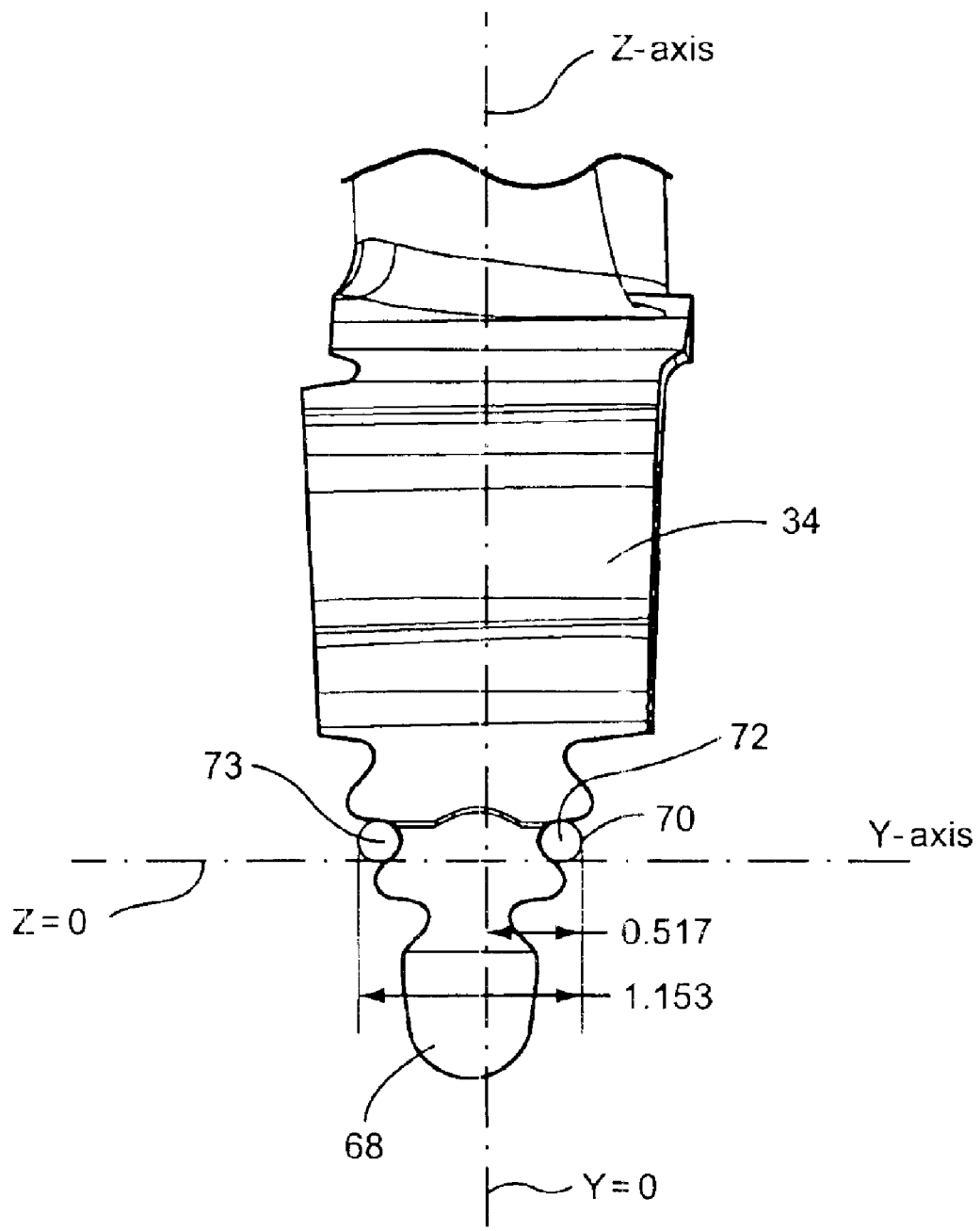
FIG. 4 is a partial enlarged front elevation of the bucket illustrated in FIG. 3.
Figure 5:
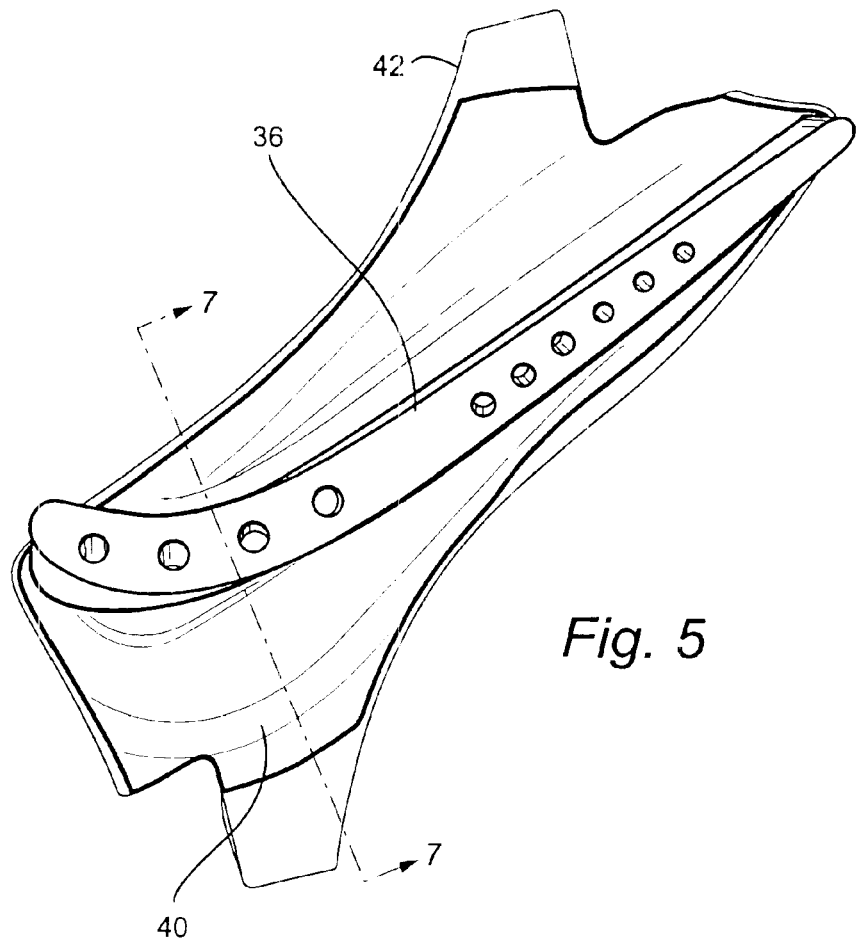
FIG. 5 is a cross-sectional view of the airfoil and tip shroud taken generally about on line 5—5 in FIG. 3.
Figure 6:
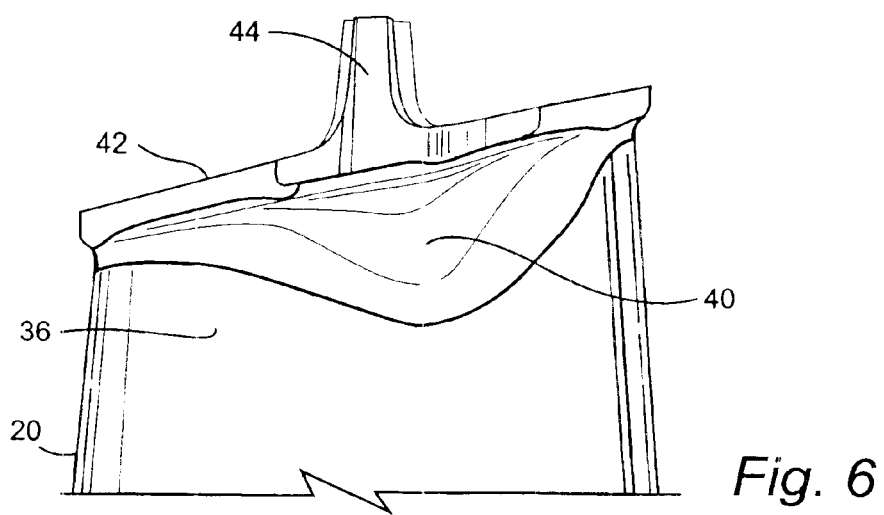
FIG. 6 is an enlarged side elevational view of the conical tip shroud fillet at the bucket tip.

The values of A and B in Table I are the distances in inches of the edge points to the intersection of offsets 01 and 02. The Z value in Table I is the height of the airfoil and Z' is the distance between the axis of rotation and the airfoil tip. The location of the radial Z axis extending perpendicular to the X-Y plane, is determined relative to predetermined reference surfaces in the shank 34 of the bucket. With specific reference to FIGS. 3 and 4, the Z axis is located 1.866 inches from a forward edge 66 of the forward bucket tang 68 (FIG. 3), along the X axis, and 0.517 inches from the outside edge 70 of the seal pin 72 (FIG. 4), in a direction normal to the shank of the bucket. Note that the distance between the outside edges of the respective pins 72, 73 is 1.153 inches (FIG. 4). The location of the Z axis thus also defines the coordinates X=0, Y=0. The Z=0 point (FIG. 3) on the z axis is located 24.1 inches from the rotor centerline when the bucket is installed on the wheel. The diameters of pins 72 and 73 are 0.224 inches.

It will also be appreciated that the values determining the surface configuration of the fillet 40 given in Table I are for a nominal fillet. Thus, ±typical manufacturing tolerances, i.e., ±values, including any coating thicknesses, are additive to the fillet surface configuration 64 as determined from the Table I. Accordingly, a distance of ±0.160 inches in a direction normal to any surface location along the fillet 40 defines a fillet profile envelope for this particular fillet 40, i.e., a range of variation between an ideal configuration of the fillet as given by the Table I above and a range of variations in the fillet configuration at nominal cold or room temperature. The fillet configuration is robust to this range of variation without impairment of mechanical and aerodynamic functions, while retaining the desired even distribution of stresses about the fillet region.

Further, Table I defines the fillet profile about the intersection of the airfoil tip and the tip shroud. Any number of X, Y locations may be used to define this profile. Thus, the profiles defined by the values of Table I embrace fillet profiles intermediate the given X, Y locations as well as profiles defined using fewer X, Y locations when the profiles defined by Table I are connected by smooth curves extending between the given locations of Table I.

Also, it will be appreciated that the fillet disclosed in the above table may be scaled up or scaled down geometrically for use in other similar fillet designs in other turbines. For example, the offsets 01 and 02, as well as the X and Y coordinate values may be scaled upwardly or downwardly by multiplying or dividing those values by a constant number to produce a scaled-up or scaled-down version of the fillet 40. The Rho value would not be multiplied or divided by the constant number since it is a non-dimensional value.

It will also be appreciated that the fillet may be defined in relation to the airfoil since the Cartesian coordinate system used to define the fillet and to define the airfoil identified above are common. Thus, the fillet may be defined in relation to the airfoil shape of each second stage bucket airfoil 36 at 92% span just radially inwardly of the fillet. A Cartesian coordinate system of X, Y and Z values wherein the X, Y coordinate values are given in Table II below define the profile of the bucket airfoil at 92% span. The Z coordinate value at 92% span is preferably 10.410 inches, the Z=0 value being preferably at 24.1 inches along the radial Z axis from the rotor centerline. The coordinate values for the X and Y coordinates are set forth in inches in Table II although other units of dimensions may be used when the values are appropriately converted. The Cartesian coordinate system has orthogonally-related X, Y and Z axes and the X axis lies parallel to the turbine rotor centerline, i.e., the rotary axis and a positive X coordinate value is axial toward the aft, i.e., exhaust end of the turbine. The positive Y coordinate value looking aft extends tangentially in the direction of rotation of the rotor and the positive Z coordinate value is radially outwardly toward the bucket tip.

By connecting the X and Y values with smooth continuing arcs, the profile section 39 at 92% span is fixed. By using a common Z-axis origin for the X, Y coordinate systems for the fillet points and the points defining the airfoil profile at 92% span, the fillet surface configuration is defined in relation to the airfoil profile at 92% span. Other percentage spans could be used to define this relationship and the 92% span as used is exemplary only. These values represent the fillet and the airfoil profile at 92% span are at ambient, non-operating or non-hot conditions and are for an uncoated surface.

Like fillet 40, there are typical manufacturing tolerances as well as coatings which must be accounted for in the actual profile of the airfoil. Accordingly, the values for the profile at 92% span given in Table II are for a nominal airfoil. It will therefore be appreciated that ±typical manufacturing tolerances, i.e., ±values, including any coating thicknesses, are additive to the X and Y values given in Table II below. Accordingly, a distance of ±0.160 inches in a direction normal to any surface location along the airfoil profile at 92% span defines an airfoil profile envelope, i.e., a range of variation between measured points on the actual airfoil surface at nominal cold or room temperature and the ideal position of those points as given in Table II below at the same temperature. The bucket airfoil at 92% span is robust to this range of variation without impairment of mechanical and aerodynamic functions.

TABLE II

| X | Y | Z' |
|---|---|---|
| −0.815 | 1.203 | 10.410 |
| −0.812 | 1.158 | 10.410 |
| −0.783 | 1.126 | 10.410 |
| −0.740 | 1.112 | 10.410 |
| −0.697 | 1.100 | 10.410 |
| −0.655 | 1.086 | 10.410 |
| −0.613 | 1.070 | 10.410 |
| −0.573 | 1.050 | 10.410 |
| −0.534 | 1.028 | 10.410 |
| −0.497 | 1.003 | 10.410 |
| −0.462 | 0.975 | 10.410 |
| −0.428 | 0.946 | 10.410 |
| −0.396 | 0.915 | 10.410 |
| −0.365 | 0.883 | 10.410 |
| −0.335 | 0.849 | 10.410 |
| −0.305 | 0.815 | 10.410 |
| −0.277 | 0.781 | 10.410 |
| −0.249 | 0.746 | 10.410 |
| −0.222 | 0.710 | 10.410 |
| −0.195 | 0.674 | 10.410 |
| −0.169 | 0.638 | 10.410 |
| −0.143 | 0.602 | 10.410 |
| −0.118 | 0.565 | 10.410 |
| −0.093 | 0.528 | 10.410 |
| −0.068 | 0.490 | 10.410 |
| −0.044 | 0.453 | 10.410 |
| −0.019 | 0.415 | 10.410 |
| 0.005 | 0.377 | 10.410 |
| 0.029 | 0.340 | 10.410 |
| 0.052 | 0.302 | 10.410 |
| 0.076 | 0.264 | 10.410 |
| 0.099 | 0.226 | 10.410 |
| 0.123 | 0.187 | 10.410 |
| 0.146 | 0.149 | 10.410 |
| 0.169 | 0.111 | 10.410 |
| 0.193 | 0.073 | 10.410 |
| 0.216 | 0.034 | 10.410 |
| 0.239 | −0.004 | 10.410 |
| 0.262 | −0.042 | 10.410 |
| 0.285 | −0.081 | 10.410 |
| 0.308 | −0.119 | 10.410 |
| 0.331 | −0.157 | 10.410 |
| 0.354 | −0.196 | 10.410 |
| 0.377 | −0.234 | 10.410 |
| 0.400 | −0.273 | 10.410 |
| 0.424 | −0.311 | 10.410 |
| 0.447 | −0.349 | 10.410 |
| 0.470 | −0.387 | 10.410 |
| 0.494 | −0.425 | 10.410 |
| 0.517 | −0.463 | 10.410 |
| 0.541 | −0.501 | 10.410 |
| 0.565 | −0.539 | 10.410 |
| 0.589 | −0.577 | 10.410 |
| 0.613 | −0.614 | 10.410 |
| 0.637 | −0.652 | 10.410 |
| 0.661 | −0.690 | 10.410 |
| 0.685 | −0.728 | 10.410 |
| 0.715 | −0.761 | 10.410 |
| 0.757 | −0.757 | 10.410 |
| 0.774 | −0.718 | 10.410 |
| 0.758 | −0.676 | 10.410 |
| 0.739 | −0.636 | 10.410 |
| 0.720 | −0.595 | 10.410 |
| 0.701 | −0.554 | 10.410 |
| 0.683 | −0.514 | 10.410 |
| 0.664 | −0.473 | 10.410 |
| 0.645 | −0.433 | 10.410 |
| 0.626 | −0.392 | 10.410 |
| 0.607 | −0.352 | 10.410 |
| 0.587 | −0.311 | 10.410 |
| 0.568 | −0.271 | 10.410 |
| 0.548 | −0.231 | 10.410 |
| 0.529 | −0.191 | 10.410 |
| 0.509 | −0.151 | 10.410 |
| 0.489 | −0.110 | 10.410 |
| 0.469 | −0.070 | 10.410 |
| 0.449 | −0.030 | 10.410 |
| 0.428 | 0.010 | 10.410 |
| 0.408 | 0.049 | 10.410 |
| 0.387 | 0.089 | 10.410 |
| 0.367 | 0.129 | 10.410 |
| 0.346 | 0.168 | 10.410 |
| 0.325 | 0.208 | 10.410 |
| 0.304 | 0.247 | 10.410 |
| 0.282 | 0.287 | 10.410 |
| 0.260 | 0.326 | 10.410 |
| 0.239 | 0.365 | 10.410 |
| 0.216 | 0.404 | 10.410 |
| 0.194 | 0.442 | 10.410 |
| 0.171 | 0.481 | 10.410 |
| 0.148 | 0.519 | 10.410 |
| 0.125 | 0.558 | 10.410 |
| 0.101 | 0.596 | 10.410 |
| 0.077 | 0.633 | 10.410 |
| 0.053 | 0.671 | 10.410 |
| 0.028 | 0.708 | 10.410 |
| 0.003 | 0.745 | 10.410 |
| −0.022 | 0.782 | 10.410 |
| −0.048 | 0.819 | 10.410 |
| −0.075 | 0.855 | 10.410 |
| −0.102 | 0.891 | 10.410 |
| −0.129 | 0.926 | 10.410 |
| −0.157 | 0.961 | 10.410 |
| −0.186 | 0.995 | 10.410 |
| −0.216 | 1.028 | 10.410 |
| −0.247 | 1.061 | 10.410 |
| −0.278 | 1.092 | 10.410 |
| −0.311 | 1.123 | 10.410 |
| −0.345 | 1.152 | 10.410 |
| −0.380 | 1.179 | 10.410 |
| −0.417 | 1.204 | 10.410 |
| −0.456 | 1.227 | 10.410 |
| −0.496 | 1.247 | 10.410 |
| −0.538 | 1.263 | 10.410 |
| −0.581 | 1.276 | 10.410 |
| −0.625 | 1.284 | 10.410 |
| −0.669 | 1.286 | 10.410 |
| −0.714 | 1.281 | 10.410 |
| −0.756 | 1.266 | 10.410 |
| −0.792 | 1.240 | 10.410 |

Thus, by defining the airfoil profile at 92% span, the same Cartesian coordinate system as used to define the fillet 40, the relationship between the fillet and airfoil is established.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine bucket having an airfoil, an airfoil tip, a tip shroud, and a fillet about an intersection of said airfoil tip and said tip shroud, said fillet having a fillet profile variable about said intersection as a function of localized stresses about said intersection.

2. A turbine bucket according to claim 1 wherein the fillet profile at one point of intersection is one of a parabola, an ellipse and a hyperbola.

3. A turbine bucket according to claim 2 wherein the fillet profile at another point of intersection is a curve different from said one parabola, an ellipse and hyperbola at said one point of intersection.

4. A turbine bucket having an airfoil, an airfoil tip, a tip shroud and a fillet about an intersection of said airfoil tip and said tip shroud, said fillet having a nominal profile substantially in accordance with coordinate values of X and Y, offset 1, offset 2 and Rho set forth in Table 1 wherein X and Y define in inches discrete apex locations about the intersection of the airfoil tip and tip shroud, offset 1 and offset 2 are distances in inches perpendicular to the airfoil surface and tip shroud undersurface, respectively, at each respective X, Y location projected along the airfoil surface and tip shroud undersurface and which offsets intersect with one another such that normal projections from the intersection of said offsets onto the tip shroud undersurface and airfoil surface, respectively, define edge points which, upon connection about the respective tip shroud and airfoil, define edges of the fillet, and Rho is a non-dimensional shape parameter ratio of $$\frac{D1}{D1+D2}$$

at each apex location, wherein D1 is a distance between a midpoint along a chord between said fillet edge points and a shoulder point on a surface of said fillet and D2 is a distance between the shoulder point and the apex location, said fillet edge points on said tip shroud and said airfoil at each X, Y location being connected by a smooth continuing arc passing through the shoulder point in accordance with the shape parameter Rho to define a profile section at each apex location, the profile sections at each apex location being joined smoothly with one another to form the nominal fillet profile.

5. A turbine bucket according to claim 4 wherein said fillet includes linear distances of A and B in inches set forth in Table I from each corresponding apex location to said edge points along the tip shroud and airfoil, respectively.

6. A bucket according to claim 4 forming part of a second stage of a turbine.

7. A bucket according to claim 4 wherein said fillet profile lies in an envelope within +/−0.160 inches in a direction normal to any fillet surface location.

8. A bucket according to claim 4 wherein the X and Y distances and the offsets 1 and 2 are scalable as a function of the same constant or number to provide a scaled up or scaled down fillet profile.

9. A turbine bucket according to claim 4 wherein said fillet includes linear distances of A and B in inches set forth in Table I from each corresponding apex location to said edge points along the tip shroud and airfoil, respectively, said fillet profile lying in an envelope within +/−0.160 inches in a direction normal to any fillet surface location.

10. A turbine bucket according to claim 4 wherein said X and Y values form a Cartesian coordinate system having a Z axis, said bucket airfoil having an airfoil shape, the airfoil having a nominal profile substantially in accordance with Cartesian coordinate values of X, Y and Z are set forth in Table II wherein the Z value is at 92% span of the airfoil and wherein X and Y values in Table II are distances in inches which, when connected by smooth continuing arcs, define an airfoil profile section at 92% span, the X, Y and Z Cartesian coordinate systems for the fillet and airfoil profile being coincident.

11. A turbine bucket according to claim 10 forming part of a second stage of a turbine.

12. A turbine bucket according to claim 10 wherein said airfoil shape lies in an envelope within ±0.160 inches in a direction normal to any airfoil surface location.

* * * * *